(12) United States Patent
Cherian et al.

(10) Patent No.: US 11,606,713 B2
(45) Date of Patent: Mar. 14, 2023

(54) INDICATING DATA FOR TRANSMISSION PER TRAFFIC IDENTIFIER

(71) Applicant: QUALCOMM Incorporated, San Diego, CA (US)

(72) Inventors: George Cherian, San Diego, CA (US); Abhishek Pramod Patil, San Diego, CA (US); Sai Yiu Duncan Ho, San Diego, CA (US); Yanjun Sun, San Diego, CA (US); Alfred Asterjadhi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/189,840

(22) Filed: Mar. 2, 2021

(65) Prior Publication Data

US 2021/0282047 A1 Sep. 9, 2021

Related U.S. Application Data

(60) Provisional application No. 62/984,724, filed on Mar. 3, 2020.

(51) Int. Cl.
*H04W 72/04* (2009.01)
*H04W 28/02* (2009.01)
(Continued)

(52) U.S. Cl.
CPC ....... *H04W 28/0268* (2013.01); *H04L 1/1614* (2013.01); *H04W 28/0263* (2013.01); *H04W 80/02* (2013.01)

(58) Field of Classification Search
CPC ......... H04W 28/0268; H04W 28/0263; H04W 80/02; H04W 4/80; H04W 52/0216; H04W 84/12; H04W 72/1263; H04L 1/1614
See application file for complete search history.

(56) References Cited

U.S. PATENT DOCUMENTS 11,246,162 B2 * 2/2022 Adachi .................. H04L 1/008
2020/0259595 A1 * 8/2020 Seok ..................... H04W 28/04
(Continued)

OTHER PUBLICATIONS

Alexander Min et al Intel IEEE 802.11-19/1544r5, date Jan. 16, 2020 (Year: 2020).*
(Continued)

*Primary Examiner* — Mahbubul Bar Chowdhury
(74) *Attorney, Agent, or Firm* — Patterson + Sheridan, L.L.P.

(57) ABSTRACT

This disclosure provides methods, devices and systems for communicating over multiple links, for example, indicating buffered units (BUs) per traffic identifier (TID) for transmission to multi-link devices (MLDs). One innovative aspect of the subject matter described in this disclosure can be implemented in a method for wireless communication. The method can be performed, for example, by a non-access point (non-AP) MLD. The non-AP MLD can receive an indication of an association identifier (AID) associated with the non-AP MLD, wherein the indication of the AID indicates whether an AP has BUs for the non-AP MLD, determine one or more links associated with one or more TIDs based on a mapping of a plurality of TIDs, including the one or more TIDs, to a plurality of links, including the one or more links, receive the BUs associated with the one or more TIDs from the AP on the determined links.

22 Claims, 10 Drawing Sheets

(51) Int. Cl.
*H04W 80/02* (2009.01)
*H04L 1/1607* (2023.01)

(56) References Cited

U.S. PATENT DOCUMENTS

2021/0029741 A1* 1/2021 Ghosh ............... H04W 74/0816
2021/0144787 A1* 5/2021 Kwon ................. H04W 72/121
2021/0211927 A1* 7/2021 Park .................. H04W 28/0278

OTHER PUBLICATIONS

Liwen Chu et al NXP IEEE 802.11-19/1617r2, date Sep. 9, 2019 (Year: 2019).*
Chu (NXP) L., et al., "A-MPDU and BA", IEEE Draft; 11-19-1856-03-00BE-A-MPDU-AND-BA, IEEE 802.11-19/1856r3, IEEE-SA Mentor, Piscataway, NJ, USA, vol. 802.11 EHT; 802.11be, No. 3, Jan. 16, 2020 (Jan. 16, 2020), pp. 1-14, XP068165384, Nov. 6, 2019, Retrieved from the Internet: URL: https://mentor.ieee.org/802.11/dcn/19/11-19-1856-03-00be-a-mpdu-and-ba.pptx [retrieved on Jan. 16, 2020] Slides 9-14.
International Search Report and Written Opinion—PCT/US2021/020737—ISA/EPO—dated Jun. 21, 2021.

Kwon (NXP) Y.H., et al., "Multi-link TIM", IEEE Draft; 11-20-0066-01-00BE-MULTI-LINK-TIM, IEEE 802.11-20/0066r1, IEEE-SA Mentor, Piscataway, NJ, USA, vol. 802.11 EHT; 802 .11be, No. 1, Mar. 2, 2020 (Mar. 2, 2020), pp. 1-14, XP068166939, Jan. 2020 (Jan. 13, 2020), Retrieved from the Internet: URL: https://mentor.ieee.org/802.11/dcn/20/11-20-0066-01-00be-multi-link-tim.pptx [retrieved on Mar. 2, 2020] Slides 2-12.
Park (Intel Corp) M., et al., "Multi-Link TIM Design", IEEE Draft; 11-20-0084-00-00BE-MULTI-LINK-TIM-DESIGN, IEEE 802.11-20/0084r0, IEEE-SA Mentor, Piscataway, NJ, USA, vol. 802.11 EHT; 802.11be, Jan. 13, 2020 (Jan. 13, 2020), pp. 1-12, XP068165168, Jan. 2020 (Jan. 9, 2020), Retrieved from the Internet: URL: https://mentor.ieee.org/802.11/dcn/20/11-20-0084-00-00be-multi-link-tim-design.pptx [retrieved on Jan. 13, 2020] Slides 2-10.
Patil (Qualcomm) A., et al., "MLO: Link Management-Follow Up", IEEE Draft; 11-19-1904-03-00BE-MLO-LINK-MANAGEMENT-FOLLOW-UP, IEEE 802.11-19/1904r3, IEEE-SA Mentor, Piscataway, NJ, USA, vol. 802.11 EHT 802.11be, No. 3, Jan. 16, 2020 (Jan. 16, 2020), pp. 1-16, XP068165461, Nov. 2019 (Nov. 8, 2019), Retrieved from the Internet: URL: https://mentor.IEEE.org/802.11/dcn/19/11-19-1904-03-00be-mlo-link-management-follow-up.pptx [retrieved on Jan. 16, 2020] Slides 2-8, Slides 15-16.

* cited by examiner

INDICATING DATA FOR TRANSMISSION PER TRAFFIC IDENTIFIER

CROSS-REFERENCE TO RELATED APPLICATIONS

This application claims benefit of and priority to U.S. Provisional Application No. 62/984,724, filed Mar. 3, 2020, which is assigned to the assignee hereof and hereby expressly incorporated by reference herein in its entirety as if fully set forth below and for all applicable purposes.

TECHNICAL FIELD

This disclosure relates generally to wireless communication over multiple links, and more specifically, to techniques for indicating buffered data for transmission to multi-link devices (MLDs) on a traffic identifier (TID) basis.

DESCRIPTION OF THE RELATED TECHNOLOGY

A wireless local area network (WLAN) may be formed by one or more wireless access points (APs) that provide a shared wireless communication medium for use by a number of client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In order to address issues associated with the increasing bandwidth requirements demanded for wireless communications systems, different schemes are being developed to allow multiple user terminals to communicate with a single access point by sharing the channel resources while achieving high data throughput. Multiple Input Multiple Output (MIMO) technology represents one such approach that has emerged as a popular technique for communication systems. MIMO technology has been adopted in several wireless communications standards such as the IEEE 802.11 standard (including amendments thereto such as 802.11ax, 802.11ay and 802.11be). The IEEE 802.11 standard denotes a set of WLAN physical layer and medium access control (MAC) standards developed by the IEEE 802.11 committee for short-range communications (such as tens of meters to a few hundred meters).

Some wireless networks, such as 802.11be networks (also referred to as Extremely High Throughput (EHT) networks), enable devices (which may be referred to as multi-link devices (MLDs)) to communicate via two or more communication links simultaneously, for example, using multi-link operation (MLO) or multi-link aggregation (MLA). The enablement of multi-link communications presents challenges associated with transmission and acknowledgement schemes.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a non-access point (non-AP) multi-link device (MLD). The method generally includes receiving an indication of an association identifier (AID) associated with the non-AP MLD, wherein the indication of the AID indicates whether an access point (AP) has buffered units (BUs) for the non-AP MLD; determining one or more links associated with one or more traffic identifiers (TIDs) based on a mapping of a plurality of TIDs, including the one or more TIDs, to a plurality of links, including the one or more links; and receiving the BUs associated with the one or more TIDs from the AP on the determined links.

Another innovative aspect of the subject matter described in this disclosure can be implemented in a method for wireless communication by an access point (AP) multi-link device (MLD). The method generally includes transmitting an indication of an association identifier (AID) associated with a non-AP MLD, wherein the indication of the AID indicates whether the AP has buffered units (BUs) for the non-AP MLD; determining one or more links associated with one or more TIDs based on a mapping of a plurality of TIDs, including the one or more TIDs, to a plurality of links, including the one or more links; and transmitting the BUs associated with the one or more TIDs to the non-AP MLD on the determined links.

Another innovative aspect of the subject matter described in this disclosure can be implemented in a wireless communication device. The wireless communication device includes at least one modem; at least one processor communicatively coupled with the at least one modem; and at least one memory communicatively coupled with the at least one processor and storing processor-readable code that, when executed by the at least one processor in conjunction with the at least one modem, is configured to: receive an indication of an association identifier (AID) associated with a non-access point (AP) multilink device (MLD), wherein the indication of the AID indicates whether an access point (AP) has buffered units (BUs) for the non-AP MLD; determine one or more links associated with one or more traffic identifiers (TIDs) based on a mapping of a plurality of TIDs, including the one or more TIDs, to a plurality of links, including the one or more links; and receive the BUs associated with the one or more TIDs from the AP on the determined links.

In some implementations of the methods and wireless communication devices, the indication of the AID comprises a traffic indication map (TIM) that includes a plurality of values, each value of the TIM indicating a respective AID associated with a respective non-AP device and indicating whether the AP has BUs for the respective non-AP device.

In some implementations of the methods and wireless communication devices, an indication of one or more traffic identifiers (TIDs) may be received or transmitted.

In some implementations, the indication of the one or more TIDs comprises a bitmap, wherein each value of the plurality of values, that indicates whether the AP has the BUs for the respective AID, corresponds to an associated TID bitmap, the TID bitmap indicating the TIDs for which the AP has the BUs for the respective AID.

In some implementations of the methods and wireless communication devices, the indication of the one or more TIDs includes a Quality of Service (QoS) message including a medium access control (MAC) header control field that indicates the TID, wherein the QoS message comprises at least one of a QoS Null message or a QoS data message.

In some implementations of the methods and wireless communication devices, the indication includes a TID field, in a message, corresponding to a value, in a traffic indication map (TIM) bitmap, indicating an association identifier (AID).

In some implementations of the methods and wireless communication devices, the indication of the one or more TIDs includes an indicator, in a in a traffic indication map (TIM) bitmap, of an association identifier (AID), wherein the AID corresponds to a link matching the indicated TID.

Another innovative aspect of the subject matter described in this disclosure can be implemented in a wireless communication device. The wireless communication device includes at least one modem; at least one processor communicatively coupled with the at least one modem; and at least one memory communicatively coupled with the at least one processor and storing processor-readable code that, when executed by the at least one processor in conjunction with the at least one modem, is configured to: transmit an indication of an association identifier (AID) associated with a non-access point (AP) multilink device (MLD), wherein the indication of the AID indicates whether an AP has buffered units (BUs) for the non-AP MLD; determine one or more links associated with one or more TIDs based on a mapping of a plurality of TIDs, including the one or more TIDs, to a plurality of links, including the one or more links; and transmit the BUs associated with the one or more TIDs to the non-AP MLD on the determined links.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
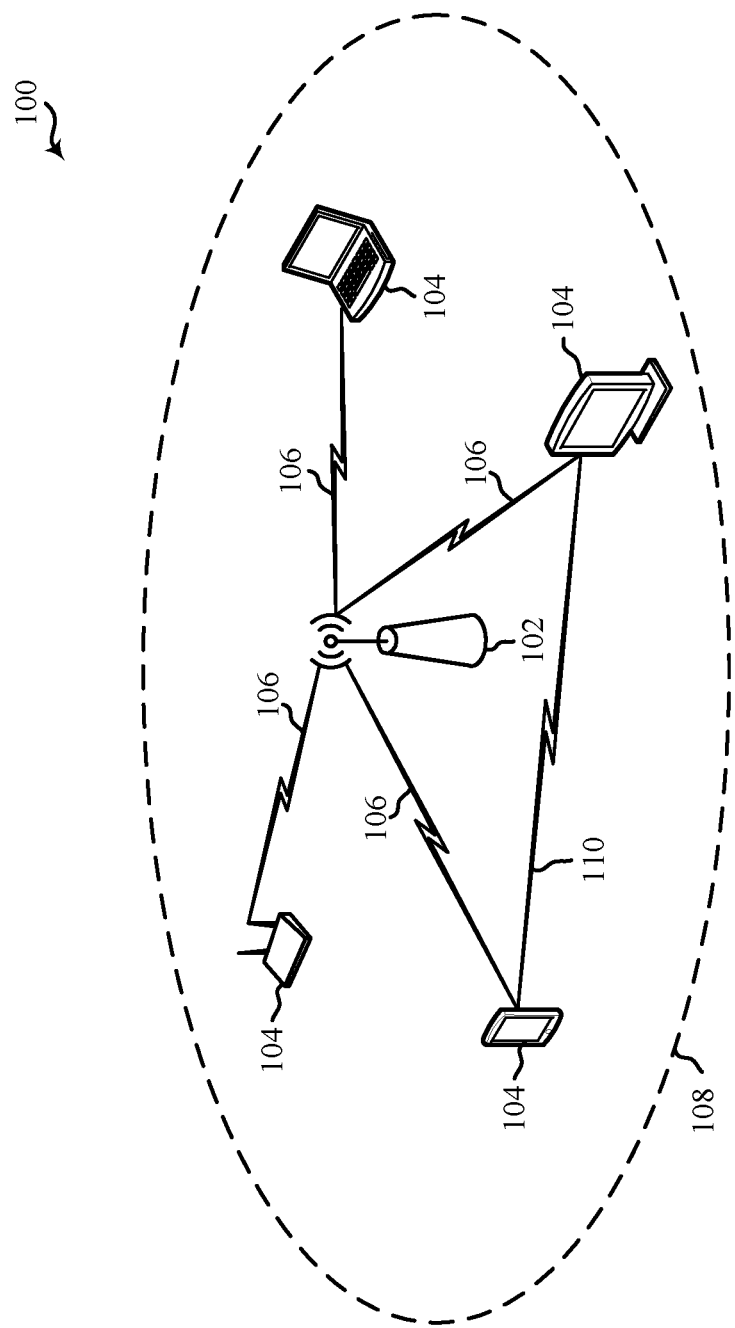
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to techniques for communicating over multiple links. Particular aspects more specifically relate to indicating buffered units (BUs) of data for transmission to multi-link devices (MLDs) on a traffic identifier (TID) basis. Some implementations more specifically relate to techniques for mapping each of one or more TIDs to a corresponding link or set of links. In some implementations, an access point (AP) may transmit a message including a traffic indication map (TIM). The TIM includes multiple bits (or "indicators" or "entries"), each of which is associated with a respective association identifier (AID) of an MLD such as a non-AP station (STA). In some cases, the value of each indicator indicates whether the AP has BUs for the STA associated with the respective AID. Each AID may be mapped to one or more links of multiple links between the AP and the STA.

In some implementations, the message may further include a TID bitmap for each AID associated with a positive indicator in the TIM. Each of the TID bitmaps may correspond to multiple TIDs. A STA receiving the message may then use the TID bitmap to determine the TID(s), and the associated links, for which the AP has BUs for delivery to the STA. The STA may then transmit a frame (e.g., a power saving poll (PS-Poll)) on a link to indicate to the AP that the STA is in an awake state on the link(s) corresponding to the determined TID(s). In some other implementations, the AP may indicate it has BUs for a first TID by transmitting a quality of service (QoS) Data or Null frame on another link(s) corresponding to a second TID, allowing the STA to monitor one link and receive an indication of BUs on the other link(s). In some other implementations, the AP may transmit a TID field indicating one TID for each positive indicator in a TIM transmitted by the AP. A receiving STA may then, based on the TID fields, determine a TID for which the AP has BUs for delivery to the STA and transmit a frame (e.g., a QoS Null) to the AP to signal that the STA is in an awake state on the link corresponding to the TID.

Particular implementations of the subject matter described in this disclosure can be implemented to realize one or more of the following potential advantages. In some implementations, the described techniques enable an AP to efficiently and quickly notify a multi-link STA of the TIDs for which the AP has BUs ready to transmit to the STA. Such implementations also enable the STA to monitor only a single link and, based on the indication of the TIDs from the AP, quickly determine on which of a plurality of links to activate receivers to receive the BUs. For example, in some cases, such implementations enable the AP to indicate, on one link, BUs on other links, allowing the STA to save power by monitoring only the one link for the indication of the buffered units on the other links.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
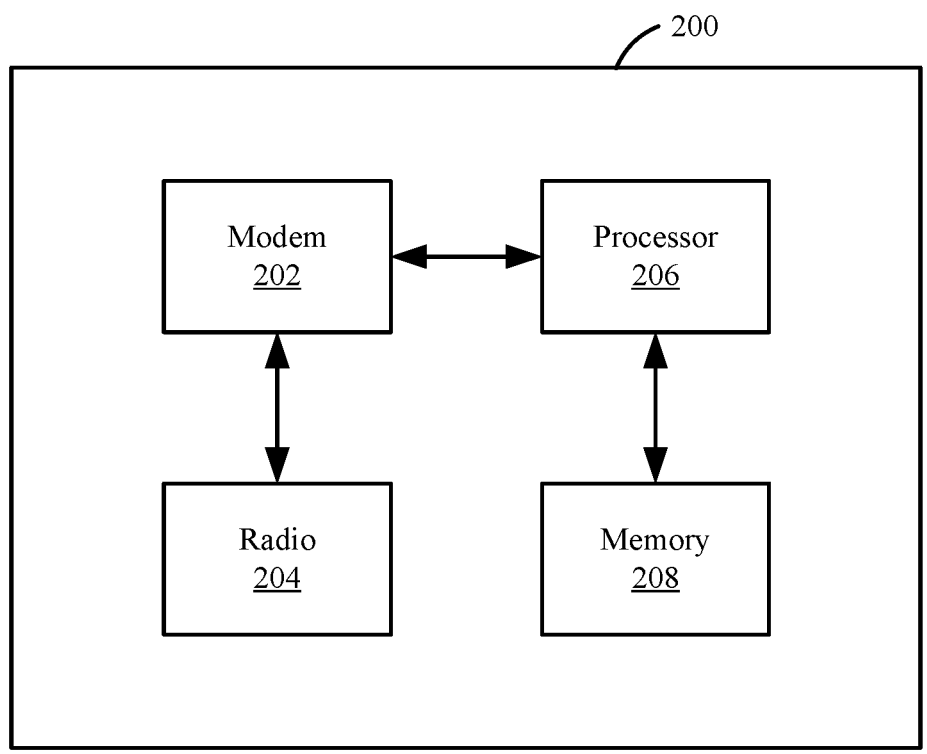
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described above with reference to FIG. 1. In some implementations, the wireless communication device 200 can be an example of a device for use in an AP such as the AP 102 described above with reference to FIG. 1. The wireless communication device 200 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 200 can be, or can include, a chip, system on chip (SoC), chipset, package or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more processors, processing blocks or processing elements (collectively "the processor 206") coupled with the modem 202. In some implementations, the wireless communication device 200 additionally includes one or more radios (collectively "the radio 204") coupled with the modem 202. In some implementations, the wireless communication device 200 further includes one or more memory blocks or elements (collectively "the memory 208") coupled with the processor 206 or the modem 202.

The modem 202 can include an intelligent hardware block or device such as, for example, an application-specific integrated circuit (ASIC), among other possibilities. The modem 202 is generally configured to implement a PHY layer, and in some implementations, also a portion of a MAC layer (for example, a hardware portion of the MAC layer). For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC) circuitry, a coder, a decoder, a multiplexer and a demultiplexer. For example, while in a transmission mode, data obtained from the processor 206 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 204. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 204, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 206) for processing, evaluation or interpretation.

The radio 204 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 206 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
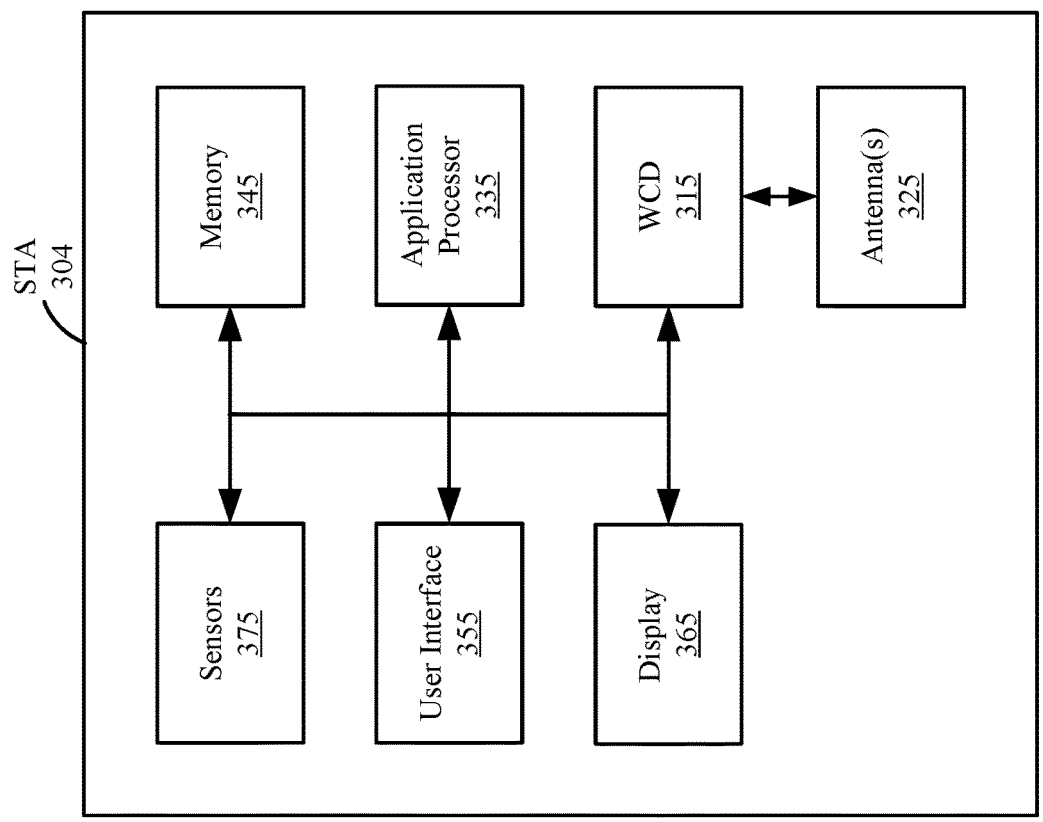
FIG. 3B shows a block diagram of an example station (STA).
Figure 3A:
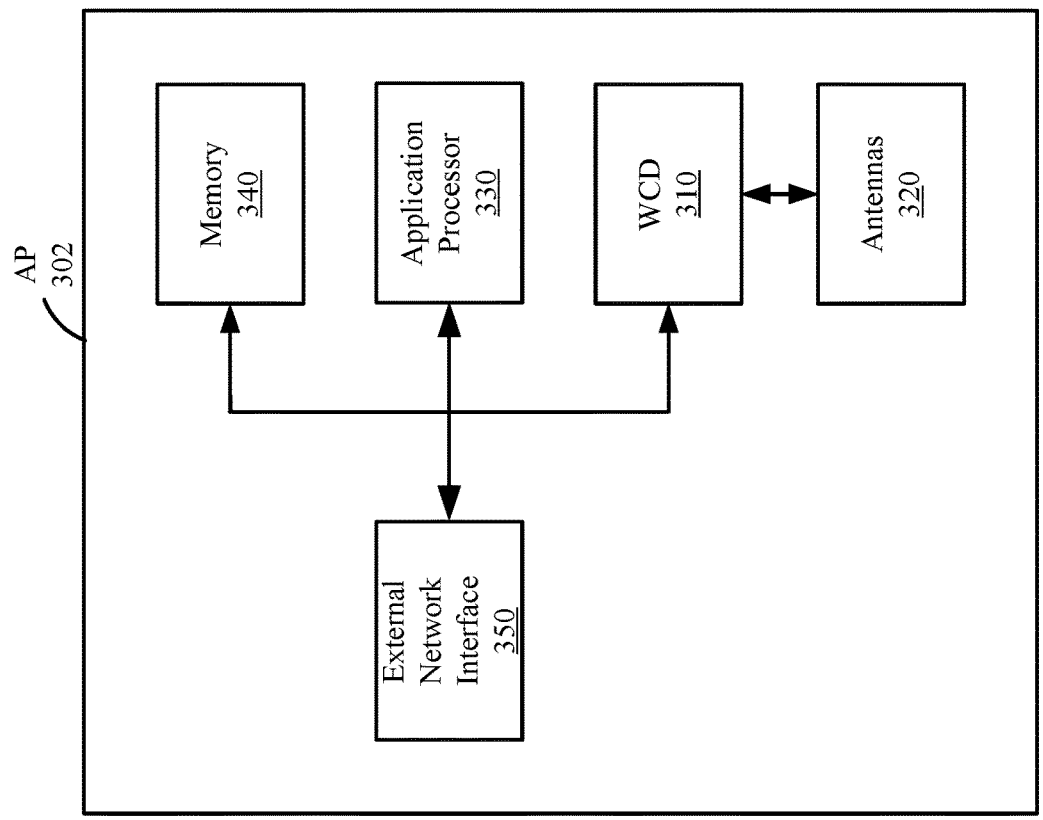
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Example Mechanism for Indicating Buffered Units Per Traffic Identifier

In some cases, an access point (AP) may assign traffic identifiers (TIDs) to stations (STAs) such that all TIDs for a STA map to all radio links (or simply "links") on which the STA operates. In such techniques, the AP does not transmit a separate indication for each TID. That is, these techniques enable a STA to be notified that the AP has BUs for the STA.

The STA can then wake up and activate a transceiver on any link, send a PS-POLL or other message to the AP to indicate awake state of the STA at least on that link, and receive the BUs from the AP at least on that link.

A multi-link device (MLD) generally refers to a single device or equipment that includes two or more STA instances or entities, implemented in a physical (PHY) layer or media access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 4:
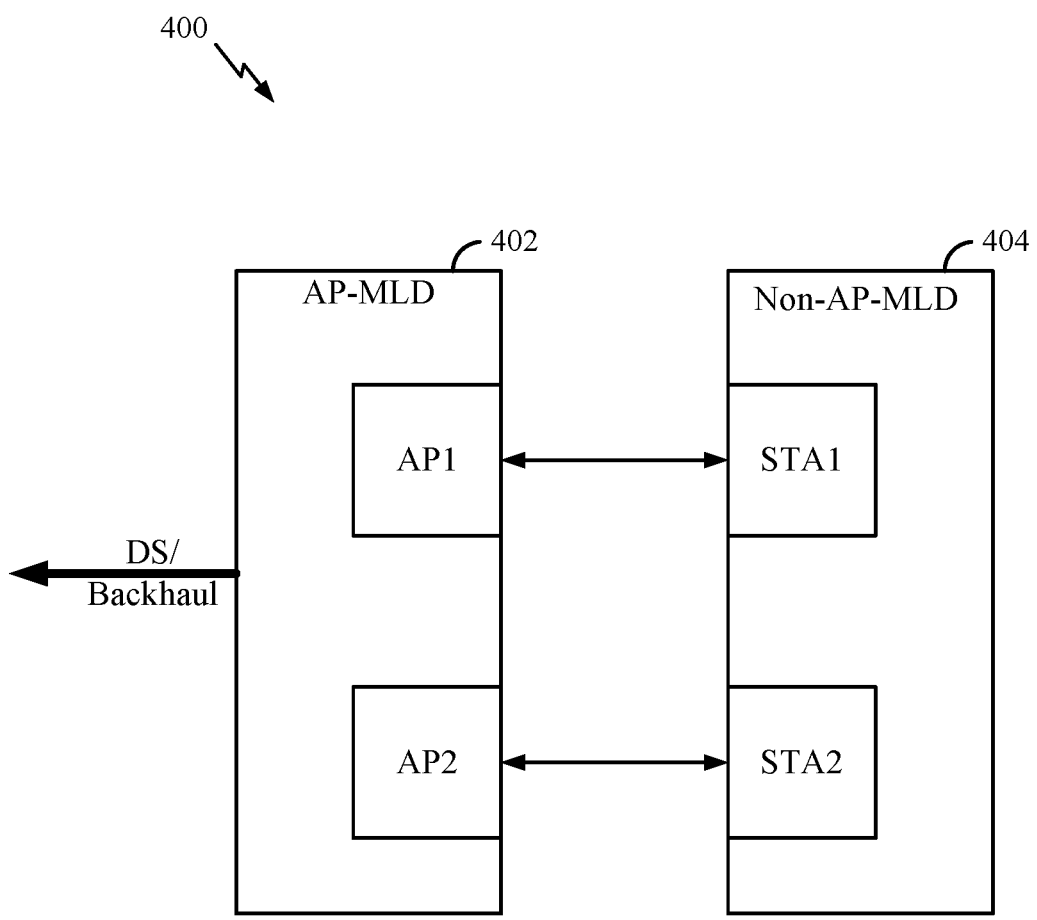
FIG. 4 illustrates communication between an AP multilink device (MLD) and a non-AP MLD.

As illustrated in FIG. 4, an AP MLD 402 may communicate with a non-AP MLD 404. As described above, each of the AP MLD 402 and the non-AP MLD 404 may include at least two STA entities (sometimes referred to as STA instances and also referred to herein simply as STAs) that may communicate with respective STA entities of the other one of the MLDs. STA entities (or instances) of the AP MLD 402 are generally APs (which may be referred to as AP-STAs or STAs serving as APs), while STA entities of the non-AP MLD 404 are generally non-AP STAs (which may be referred to simply as a STA). For example, as shown in FIG. 4, the AP MLD 402 includes two APs, AP1 and AP2, that may communicate with respective STA entities in the non-AP MLD, such as STA1 and STA2. In some cases, MLDs, such as the AP MLD 402 and non-AP MLD 404, may use multi-link aggregation (MLA) (including packet level aggregation), whereby MPDUs from a same TID can be sent via two or more links.

Multi-link operation (MLO) is generally regarded as one of the key features in the upcoming 802.11be standard. In some cases, two types of aggregation may be associated with MLO, such as flow-based aggregation and packet-based aggregation. In flow based aggregation, MPDUs of a TID may be mapped to a specific link and different TIDs may be mapped to different links. In packet based aggregation, MPDUs of a TID may be mapped to more than one link and the MPDUs of the TID may be sent on any of the links to which the TID is mapped. Power-saving is also a big consideration for MLO. When in an idle-mode, a STA may not be required to monitor all of the links. For example, in some cases, a STA may monitor just one link while operating in idle-mode. In such cases, an AP may transmit, on the one link, an indication of buffered units (BUs) on other links, allowing the STA to monitor only the one link for the indication of the buffered units on the other links.

In some cases, using techniques that involve BU advertisement per link may not desirable as the STA may not have flexibility to choose the link to receive the BUs. Instead, it may be desirable for a STA to be able to fetch data from any of the links to which a TID is mapped for power saving and flexibility purposes. That is, it may be advantageous for network devices to transmit a buffered unit indication for each TID, which may save power at a STA and provide the STA with the flexibility to choose which link to receive the BUs. For example, if a particular TID X is mapped to link 1 and 2 and another TID Y is mapped to link 2 and 3, under the TID indication scheme, an AP may indicate there are BUs for TID X and Y, allowing the STA pick link 2, for example, to retrieve the BUs for both TIDs and save power by not having to turn on radios for link 1 and link 3.

Various aspects relate generally to techniques for communicating over multiple links. More specifically, such techniques may include indicating BUs of data for transmission to MLDs on a TID basis. Some implementations more specifically relate to techniques for mapping each of one or more TIDs to a corresponding link or set of links. In some implementations, an AP may transmit a message including a traffic indication map (TIM), as well as a TID per each positive indicator in the TIM, to multiple stations (STAs). A STA receiving the message may then use the various TID bitmaps to determine the TID(s) for which the AP has BUs for delivery to the STA. The STA may additionally transmit a frame (e.g., a power saving poll (PS-Poll)) to indicate to the AP that the STA is in an awake state on the link(s) corresponding to the determined TID(s).

In some such implementations, the AP may indicate it has BUs for a first TID by transmitting a message (e.g., a quality of service (QoS) Data or Null frame) on a link corresponding to a second TID. In some other implementations, the AP may transmit a TID bitmap indicating one TID for each positive indicator in a TIM transmitted by the AP. A receiving STA may then use the various TID bitmaps to determine a first TID for which the AP has BUs for delivery to the STA and transmit a frame (e.g., a QoS Null) to indicate to the AP that the STA is in an awake state on the link corresponding to the determined TID. In some such implementations, the AP may map each link to a single association identifier (AID) and transmit a TIM indicating each AID for which the AP has BUs to transmit to the STA. The STA may then determine which TIDs are associated with the BUs, and also determine which links to receive the BUs from, based on the indicated AIDs in the TIM.

Particular implementations of the subject matter described in this disclosure can be implemented to realize one or more of the following potential advantages. In some implementations, the described techniques enable an AP to efficiently and quickly notify a multi-link STA of the TIDs for which the AP has BUs ready to transmit to the STA. Such implementations also enable the STA to monitor a single link and, based on the indication of the TIDs from the AP, quickly determine on which links to activate receivers to receive the BUs.

Figure 5:
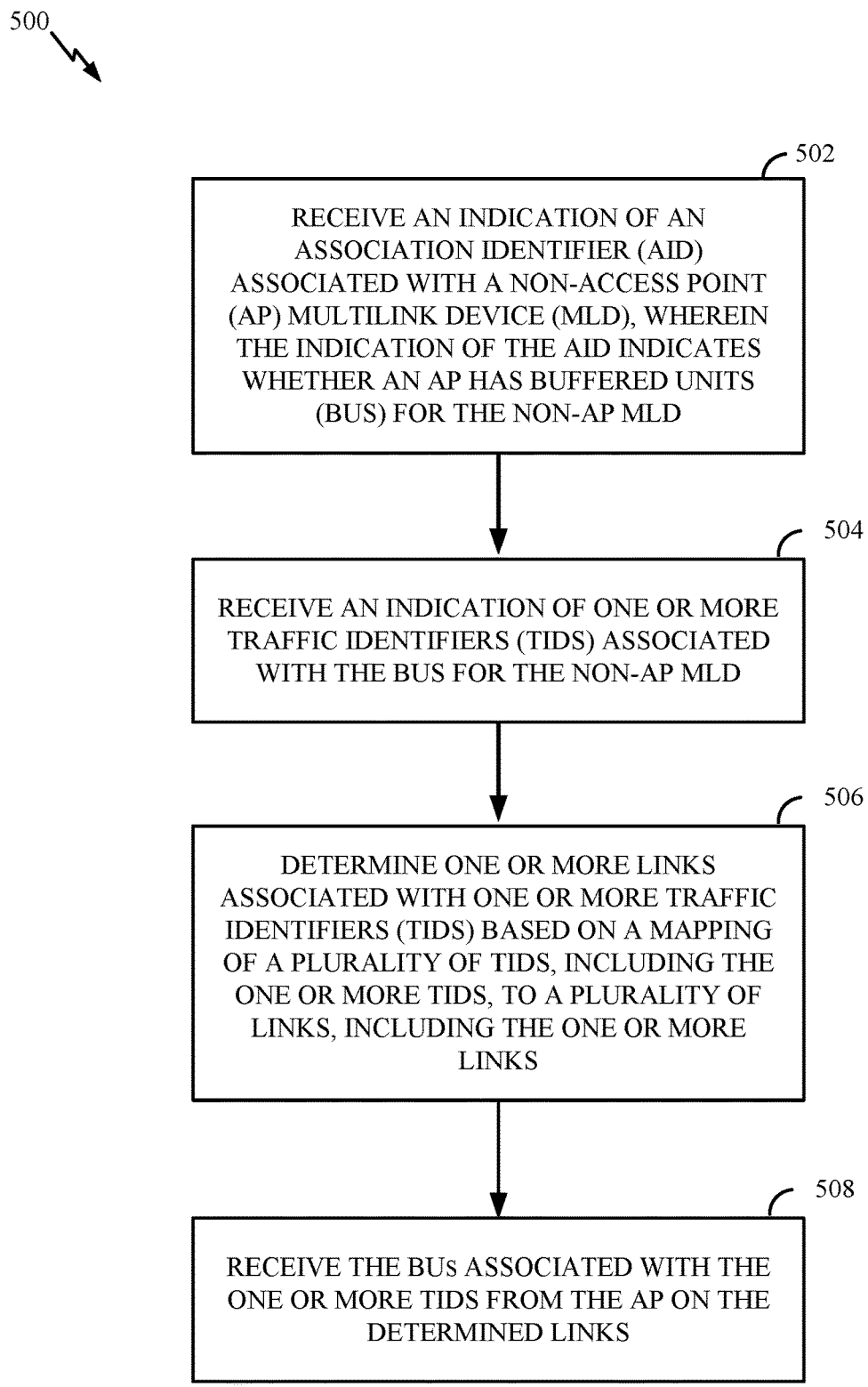
FIG. 5 shows a flowchart illustrating an example process for receiving indications of buffered units (BUs) per traffic identifier (TID) according to some implementations.

FIG. 5 shows a flowchart illustrating an example process 500 for indicating buffered units (BUs) per traffic identifier (TID) according to some implementations. The operations of the process 500 may be implemented by a STA or its components as described herein. For example, the process 500 may be performed by a non-access point (non-AP) multi-link device (MLD), such as one of the STAs 104 and 304 described above with reference to FIGS. 1 and 3B, respectively, or the wireless communication device 200 described above with reference to FIG. 2. In some implementations, the process 500 may be performed by an AP, such as one of the APs 102 and 302 described above with reference to FIGS. 1 and 3A, respectively.

In some implementations, in block 502, the non-AP MLD receives an indication of an association identifier (AID) associated with the non-AP MLD, wherein the indication of the AID indicates whether an access point (AP) has buffered units (BUs) for the non-AP MLD.

In some implementations, in block 504, the non-AP MLD receives an indication of one or more traffic identifiers (TIDs) associated with the BUs for the non-AP MLD.

In some implementations, in block 506, the non-AP MLD determines one or more links associated with one or more traffic identifiers (TIDs) based on a mapping of a plurality of TIDs, including the one or more TIDs, to a plurality of links, including the one or more links.

In some implementations, in block 508, the non-AP MLD receives the BUs associated with the one or more TIDs from the AP on the determined links.

Figure 6:
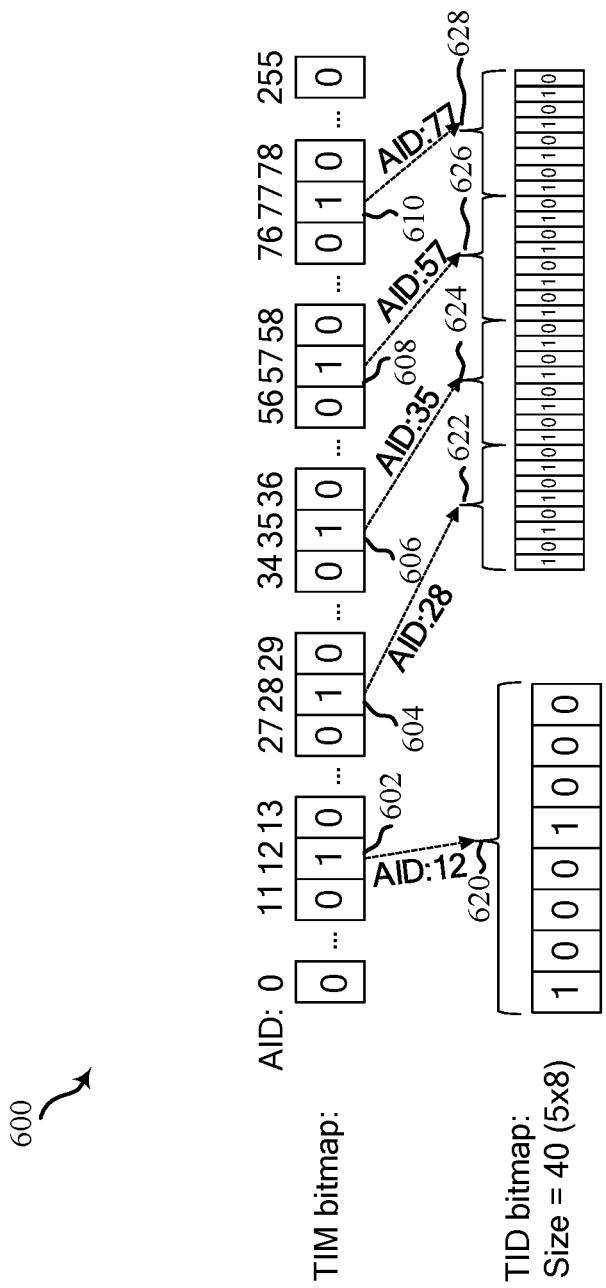
FIG. 6 shows an exemplary traffic indication map (TIM) with corresponding bitmaps to TIDs, according to some implementations.

In some implementations, the indication in block 502 may include a traffic indication map (TIM) bitmap and the indication in block 504 may include a TID bitmap corresponding to a value in a traffic indication map (TIM) bitmap. For example, as shown in FIG. 6, a STA or non-AP MLD may receive a TIM bitmap 600 that includes values of 1 in values or bit locations within the TIM bitmap 600 corresponding to association identifiers (AIDs), such as the AIDs at 602, 604, 606, 608, and 610. In the example, for each value of 1 in the TIM bitmap 600, the non-AP MLD also receives a TID bitmap, as shown at 620, 622, 624, 626, and 628, that indicates for which TIDs, corresponding to the AIDs indicated by the TIM bitmap, the non-AP MLD can receive BUs. In some implementations, the value in the TIM bitmap indicates one or more AIDs and the TID bitmap includes one or more TID fields. In some cases, each TID field in the TID bitmap corresponds to one of the indicated AIDs in the TIM bitmap.

In some implementations, the indication in block 504 includes a Quality of Service (QoS) message including a medium access control (MAC) header control field that indicates the TID. In some cases, the QoS message includes at least one of a QoS Null message or a QoS data message. For example, an AP may transmit TIM signaling indicating a buffered unit for a non-AP MLD, such as in block 502, according to previously known techniques. Since the non-AP MLD does not know the exact TID, the non-AP MLD wakes up transceivers for any configured links and sends a power saving poll (PS-poll) or equivalent on the configured links. If the AP does not have buffered units for any TID that is mapped to that link, but has buffered units for other TIDs, then the AP may send a QoS Null with high efficiency A (HE-A) control field or any equivalent MAC header control field indicating the TIDs for which the AP has buffered units for the non-AP MLD. If the AP has buffered units for any TID that is mapped to a link for which the STA transmitted the PS-poll and also has buffered units for other TIDs mapped to other links, then the AP may deliver MPDUs for the TID(s) that are mapped to this link and may include information regarding other TIDs for which the AP has buffered units using an HE-A control field or any equivalent MAC header control field of the MAC header of the MPDUs sent to the non-AP MLD.

In some implementations, a new HE-A control field (e.g., TID control) may be transmitted by the AP that carries a bitmap consisting of 8 bits for signaling each TID for which the AP has BUs for the non-AP MLD. In some cases, each bit of the 8-bit bitmap may correspond to a different TID.

In some implementations, a device performing example process 500, such as the non-AP MLD, may receive a message including a TIM in block 502 and transmit a poll message in response to the TIM. In some cases, the QoS message may be received in response to the poll message. For example, the non-AP MLD may receive a TIM, transmit a PS-poll in response to the TIM, and, thereafter, may receive the QoS message in response to the PS-poll message.

In some implementations, receiving the BUs in block 508 includes receiving another indication of another TID for which the AP has other BUs for the non-AP MLD. In some cases, the non-AP MLD may receive the other BUs from the AP based on the other indication.

In some implementations, the indication in block 504 includes a TID field, in a message, corresponding to an AID indicated in a TIM. The TID that is signaled may be based on criteria, such as the TID having the stricter latency requirement compared to other TIDs for which AP has BUs or the TID for which the AP has the largest amount of BUs.

Figure 7:
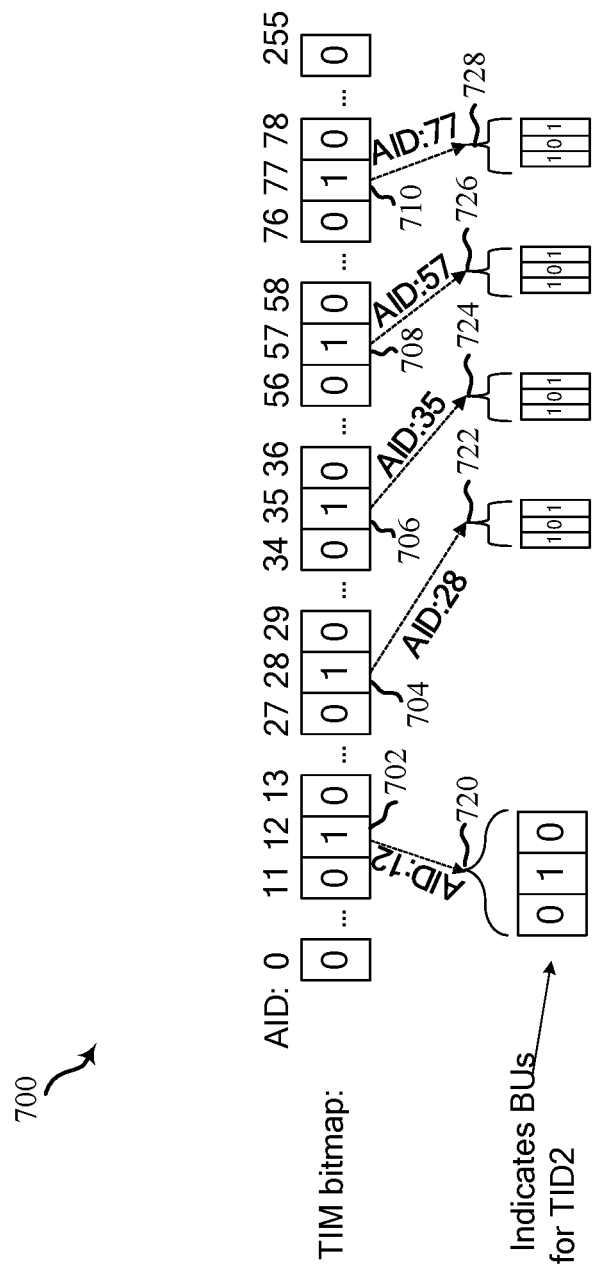
FIG. 7 shows an exemplary TIM with corresponding bitmaps to single TIDs, according to some implementations.

The AP may signal additional TIDs for which it has BUs via an HE control field (e.g., by extending existing A-Control subfield or defining a new A-Control type) or other fields in the MAC header. In some implementations, the AP may use three bits to indicate the TID corresponding to the AID signaled in the TIM. For example, as shown in FIG. 7, the non-AP MLD may receive a TIM bitmap 700 that includes values of 1 in bit locations in the TIM bitmap 700 corresponding to AIDs, such as the AIDs at 702, 704, 706, 708, and 710. In the example, for each value of 1 in the TIM bitmap 700, the STA also receives a TID bitmap, as shown at 720, 722, 724, 726, and 728. The TID bitmap may indicate for which one TID, corresponding to the AIDs indicated by the TIM bitmap, the non-AP MLD can receive BUs.

In some implementations, the indication in block 502 or 504 may include an AID indicated in a TIM bitmap. In such cases, the AID may correspond to a link matching the indicated TID. That is, an AID may be mapped to a single link and a single TID.

Figure 8:
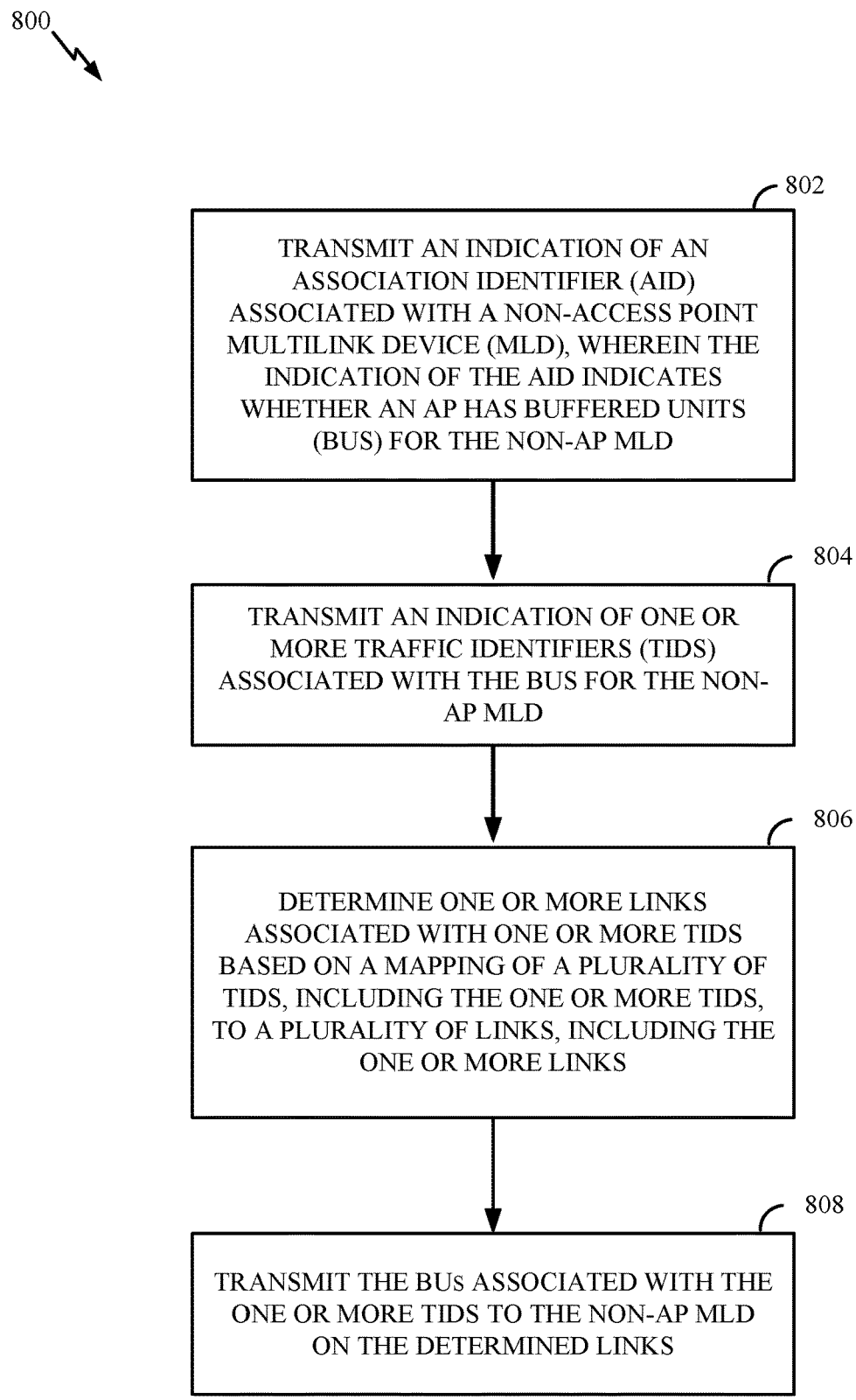
FIG. 8 shows a flowchart illustrating an example process for indicating BUs per TID according to some implementations.

FIG. 8 shows a flowchart illustrating an example process 800 for indicating buffered units (BUs) per traffic identifier (TID) according to some implementations. The process 800 may be performed by an access point (AP) multi-link device (MLD) such as the wireless communication device 200 described above with reference to FIG. 2. In some implementations, the process 800 may be performed by a wireless communication device operating as or within a STA, such as one of the STAs 104 and 304 described above with reference to FIGS. 1 and 3B, respectively.

In some implementations, in block 802, the AP MLD transmits an indication of an association identifier (AID) associated with a non-AP MLD, wherein the indication of the AID indicates whether the AP has buffered units (BUs) for the non-AP MLD.

In some implementations, in block 804, the AP MLD transmits an indication of one or more traffic identifiers (TIDs) associated with the BUs for the non-AP MLD.

In some implementations, in block 806, the AP MLD determines one or more links associated with one or more TIDs based on a mapping of a plurality of TIDs, including the one or more TIDs, to a plurality of links, including the one or more links.

In some implementations, in block 808, the AP MLD transmits the BUs associated with the one or more TIDs to the non-AP MLD on the determined links.

In some implementations, transmitting the indication in block 802 may include transmitting a TIM bitmap. Additionally, in some cases, transmitting the indication in block 804 includes transmitting a TID bitmap corresponding to a value in the TIM bitmap. For example, as shown in FIG. 6, the AP MLD may transmit a TIM bitmap 600 that includes values of 1 in values or bit locations within the TIM bitmap 600 corresponding to AIDs, such as the AIDs at 602, 604, 606, 608, and 610. In this example, for each value of 1 in the TIM bitmap 600, the AP MLD may also transmit a TID bitmap, as at 620, 622, 624, 626, and 628, that indicates for which TIDs, corresponding to the AIDs indicated by the TIM bitmap, the AP has BUs. In some implementations, the value in the TIM bitmap indicates one or more AIDs and the TID bitmap includes one or more TID fields. In some implementations, each TID field in the TID bitmap corresponding to one of the indicated AIDs in the TIM bitmap.

In some implementations, transmitting the indication in block 804 includes transmitting a QoS message including a MAC header control field that indicates the TID. In some cases, the QoS message includes at least one of a QoS Null message or a QoS data message. For example, the AP MLD may transmit TIM signaling indicating a buffered unit for a non-AP MLD, according to previously known techniques. Since the non-AP MLD does not know the exact TID, the non-AP MLD may wake up its transceivers for any configured link(s) and sends a power saving poll (PS-poll) or equivalent. If the AP does not have buffered units for any TID that is mapped to that link, but has buffered units for other TIDs, then the AP may send a QoS Null with a high efficiency A (HE-A) control field or any equivalent MAC header control field indicating the TIDs for which the AP has buffered units for the non-AP MLD. If the AP has buffered units for any TID that is mapped to a link for which the STA transmitted the PS-poll and also has buffered units for other TIDs mapped to other links, then the AP may deliver MPDUs for the TID(s) that are mapped to this link and may also include information regarding other TIDs for which the AP has buffered units using an HE-A control field or any equivalent MAC header control field of the MAC header of the MPDUs sent to the non-AP MLD.

In some implementations, a new HE-A control field (e.g., TID Control) may be transmitted by the AP MDL that carries a bitmap consisting of 8 bits to signal each TID for which the AP has BUs for a non-AP MLD. In some cases, each bit of the 8-bit bitmap may correspond to a TID.

In some implementations, a device performing example process 800, such as the AP MLD, may transmit a message including a TIM in block 502 and may receive a poll message in response to the TIM. In some cases, transmitting the QoS message may be performed in response to the poll message. For example, the AP MLD may transmit a TIM, receive a PS-poll in response to the TIM, and, thereafter, may transmit the QoS message.

In some implementations, transmitting the BUs in block 808 includes transmitting another indication of another TID for which the AP MLD has other BUs for the non-AP MLD. The AP MLD may then transmit the other BUs to the non-AP MLD.

In some implementations, the indication in block 804 includes a TID field, in a message, corresponding to a value, in a TIM bitmap, that indicates an AID. The TID that is signaled may be based on criteria, such as the TID having the stricter latency requirement compared to other TIDs for which the AP MLD has BUs or the TID for which the AP MLD has the largest amount of BUs. The AP MLD may signal additional TIDs for which it has BUs via an HE control field or other fields in the MAC header. In some implementations, the AP MLD may use three bits to indicate the TID corresponding to the AID signaled in the TIM. For example, as shown in FIG. 7, an AP MLD may transmit a TIM bitmap 700 that includes values of 1 in bit locations in the TIM bitmap corresponding to AIDs, such as the AIDs at 702, 704, 706, 708, and 710. In the example, for each value of 1 in the TIM bitmap 700, the AP MLD also transmits a TID bitmap, as at 720, 722, 724, 726, and 728. The TID bitmap may indicate for which one TID, corresponding to the AIDs indicated by the TIM bitmap, the non-AP MLD can receive BUs.

In some implementations, the indication in block 802 or 804 includes an AID indicated in a TIM bitmap. In such cases, the AID may correspond to a link matching the indicated TID. That is, an AID may be mapped to a single link and a single TID by the AP MLD.

Example Wireless Communication Devices

Figure 9:
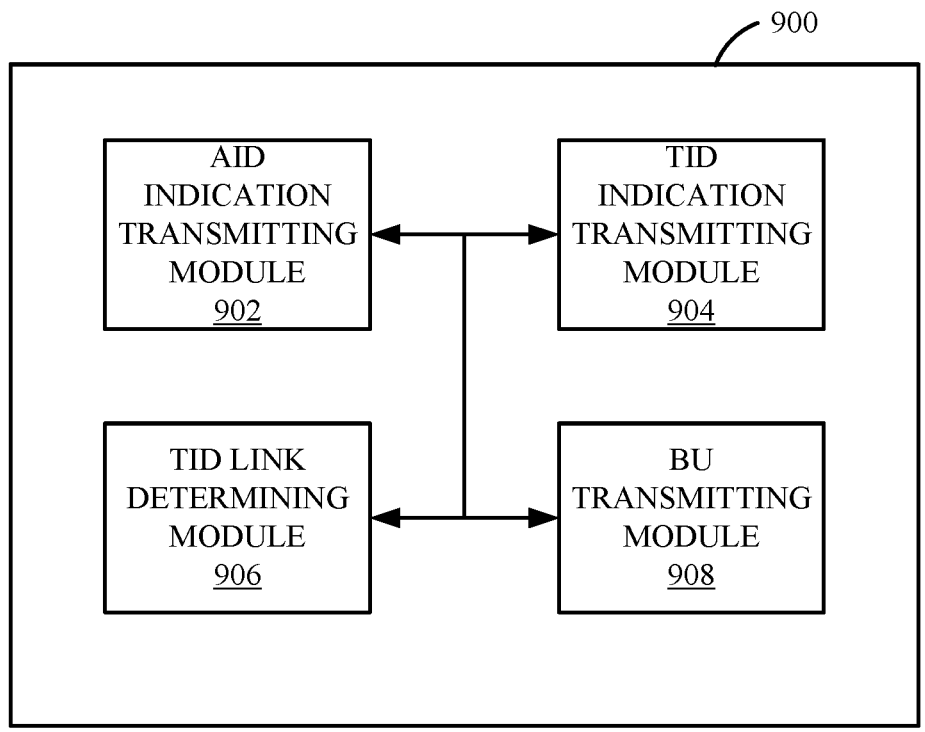
FIG. 9 shows a block diagram of an example wireless communication device according to some implementations.

FIG. 9 shows a block diagram of an example wireless communication device 900 according to some implementations. In some implementations, the wireless communication device 900 is configured to perform the process 800 described above with reference to FIG. 8. The wireless communication device 900 may be an example implementation of the wireless communication device 200 described above with reference to FIG. 2. For example, the wireless communication device 900 can be a chip, SoC, chipset, package or device that includes at least one processor and at least one modem (for example, a Wi-Fi (IEEE 802.11) modem or a cellular modem). In some implementations, the wireless communication device 900 can be a device for use in an AP, such as one of the APs 102 and 302 described above with reference to FIGS. 1 and 3A, respectively. In some other implementations, the wireless communication device 900 can be an AP that includes such a chip, SoC, chipset, package or device as well as at least one transmitter, at least one receiver, and at least one antenna.

As shown, the wireless communication device 900 includes an AID indication transmitting module 902, a TID indication transmitting module 904, a TID link determining module 906, and a BU transmitting module 908. Portions of one or more of the modules 902, 904, 906, and 908 may be implemented at least in part in hardware or firmware. For example, the BU transmitting module 908 may be implemented at least in part by a modem (such as the modem 202). In some implementations, at least some of the modules 902, 904, 906, and 908 are implemented at least in part as software stored in a memory (such as the memory 208). For example, portions of one or more of the modules 902, 904, 906, and 908 can be implemented as non-transitory instructions (or "code") executable by a processor (such as the processor 206) to perform the functions or operations of the respective module.

In some implementations, the AID indication transmitting module 902 is configured to transmit an indication of an AID associated with a non-AP MLD, wherein the indication of the AID indicates whether the AP has buffered units (BUs) for the non-AP MLD.

In some implementations, the TID indication transmitting module 904 is configured to transmit an indication of one or more traffic identifiers (TIDs) associated with the BUs for the non-AP MLD.

In some implementations, the TID link determining module 906 is configured to determine one or more links associated with one or more TIDs based on a mapping of a plurality of TIDs, including the one or more TIDs, to a plurality of links, including the one or more links.

In some implementations, the BU transmitting module 908 is configured to transmit the BUs associated with the one or more TIDs to the non-AP MLD on the determined links.

Figure 10:
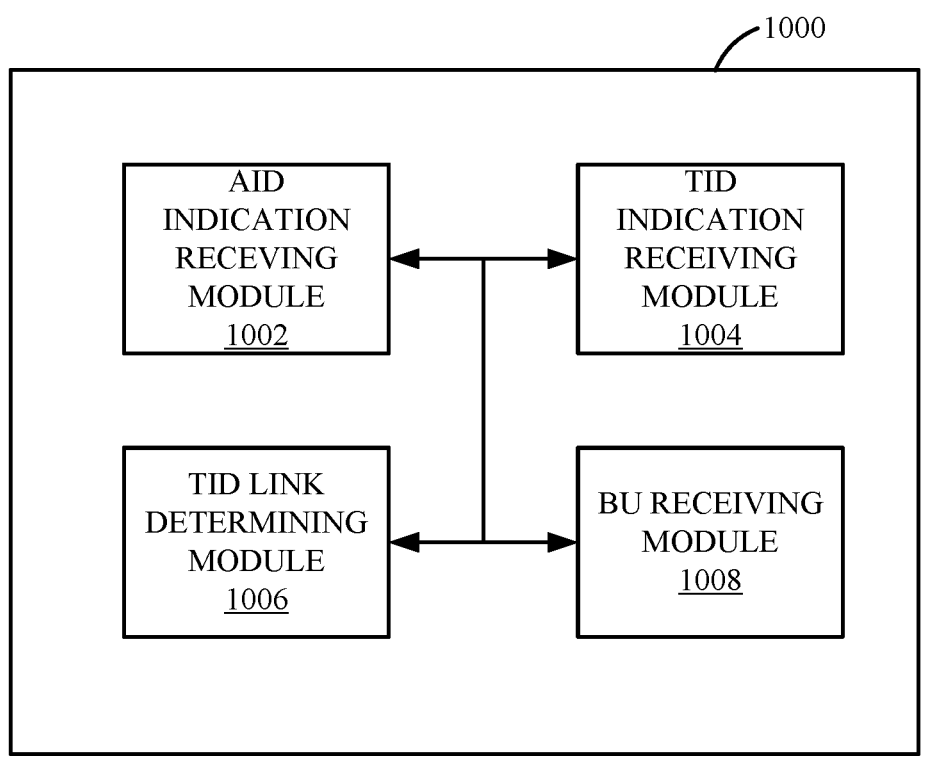
FIG. 10 shows a block diagram of an example wireless communication device according to some implementations.

FIG. 10 shows a block diagram of an example wireless communication device 1000 according to some implementations. In some implementations, the wireless communication device 1000 is configured to perform the process 500 described above with reference to FIG. 5. The wireless communication device 1000 may be an example implementation of the wireless communication device 200 described above with reference to FIG. 2. For example, the wireless communication device 1000 can be a chip, SoC, chipset, package or device that includes at least one processor and at least one modem (for example, a Wi-Fi (IEEE 802.11) modem or a cellular modem). In some implementations, the wireless communication device 1000 can be a device for use in a STA, such as one of the STAs 104 and 304 described above with reference to FIGS. 1 and 3B, respectively. In some other implementations, the wireless communication device 1000 can be a STA that includes such a chip, SoC, chipset, package or device as well as at least one transmitter, at least one receiver, and at least one antenna.

The wireless communication device 1000 includes an AID indication receiving module 1002, a TID indication receiving module 1004, a TID link determining module 1006, and a BU receiving module 1008. Portions of one or more of the modules 1002, 1004, 1006, and 1008 may be implemented at least in part in hardware or firmware. For example, the BU receiving module 1008 may be implemented at least in part by a modem (such as the modem 202). In some implementations, at least some of the modules 1002, 1004, 1006, and 1008 are implemented at least in part as software stored in a memory (such as the memory 208). For example, portions of one or more of the modules 1002, 1004, 1006, and 1008 can be implemented as non-transitory instructions (or "code") executable by a processor (such as the processor 206) to perform the functions or operations of the respective module.

In some implementations, the AID indication receiving module 1002 is configured to receive an indication of an association identifier (AID) associated with the non-AP MLD, wherein the indication of the AID indicates whether an access point (AP) has buffered units (BUs) for the non-AP MLD.

In some implementations, the TID indication receiving module 1004 is configured to receive an indication of one or more traffic identifiers (TIDs) associated with the BUs for the non-AP MLD.

In some implementations, the TID link determining module 1006 is configured to determine one or more links associated with one or more traffic identifiers (TIDs) based on a mapping of a plurality of TIDs, including the one or more TIDs, to a plurality of links, including the one or more links.

In some implementations, the BU receiving module 1008 is configured to receive the BUs associated with the one or more TIDs from the AP on the determined links.

Example Clauses

Implementation examples are described in the following numbered clauses:

Clause 1: A method for wireless communications by a non-access point (non-AP) multi-link device (MLD), comprising: receiving an indication of an association identifier (AID) associated with the non-AP MLD, wherein the indication of the AID indicates whether an access point (AP) has buffered units (BUs) for the non-AP MLD; determining one or more links associated with one or more traffic identifiers (TIDs) based on a mapping of a plurality of TIDs, including the one or more TIDs, to a plurality of links, including the one or more links; and receiving the BUs associated with the one or more TIDs from the AP on the determined links.

Clause 2: The method of Clause 1, further comprising receiving an indication of the one or more TIDs.

Clause 3: The method of Clause 2, wherein: the indication of the AID comprises a traffic indication map (TIM) that includes a plurality of values, each value of the TIM indicating a respective AID associated with a respective non-AP device and indicating whether the AP has BUs for the respective non-AP device; and receiving the indication of the one or more TIDs comprises receiving the TIM and identifying a value of the plurality of values that corresponds to the AID of the non-AP MLD.

Clause 4: The method of Clause 3, further comprising receiving a TID bitmap, wherein: each value of the plurality of values, that indicates whether the AP has the BUs for the respective AID, corresponds to an associated TID bitmap, the TID bitmap indicating the TIDs for which the AP has the BUs for the respective AID; and receiving the indication of the one or more TIDs comprises receiving the TID bitmap and identifying the one or more TIDs based on the TID bitmap.

Clause 5: The method of Clause 4, wherein each TID in the TID bitmap is mapped to a respective link or a respective set of links of the one or more links.

Clause 6: The method of Clause 5, wherein each link of the one or more links is associated with at least one TID.

Clause 7: The method of any of Clauses 3-6, wherein the indication of the one or more TIDs is received in a message including a medium access control (MAC) header control field that indicates the one or more TIDs.

Clause 8: The method of Clause 7, wherein the MAC header control field comprises a high efficiency (HE) A-control field including at least one of a TID bitmap or a TID field that indicates the one or more TIDs.

Clause 9: The method of any of Clauses 7-8, wherein each TID is mapped to one link or a set of links of the plurality of links.

Clause 10: The method of any of Clauses 7-9, wherein the message comprises a Quality of Service (QoS) Null message or a QoS data message that indicates the one or more TIDs.

Clause 11: The method of Clause 10, further comprising transmitting a poll message to the AP, wherein the QoS Null message or the QoS data message is received in response to the poll message.

Clause 12: The method of any of Clause 3, wherein each respective AID indicated in the TIM is mapped to a single respective link of the plurality of links and wherein receiving the indication of the one or more TIDs comprises determining the one or more TIDs based on the single respective link associated with the AID of the non-AP MLD.

Clause 13: The method of Clause 3, further comprising: transmitting a poll message in response to receiving the TIM, wherein the BUs are received in response to the poll message.

Clause 14: The method of any of Clauses 2-13, further comprising: receiving another indication of another TID for which the AP has other BUs for the non-AP MLD; and determining another link associated with the other TID, wherein receiving the BUs comprises receiving the other BUs from the AP on the other link.

Clause 15: A method for wireless communications by an access point (AP) multi-link device (MLD), comprising: transmitting an indication of an association identifier (AID) associated with a non-AP MLD, wherein the indication of the AID indicates whether the AP has buffered units (BUs) for the non-AP MLD; determining one or more links associated with one or more TIDs based on a mapping of a plurality of TIDs, including the one or more TIDs, to a plurality of links, including the one or more links; and transmitting the BUs associated with the one or more TIDs to the non-AP MLD on the determined links.

Clause 16: The method of Clause 16, further comprising transmitting an indication of the one or more TIDs Clause 17: The method of Clause 17, wherein: the indication of the AID comprises a traffic indication map (TIM) that includes a plurality of values, each value being associated with a respective AID associated with a respective non-AP device and indicating whether the AP MLD has BUs for the respective non-AP device; and transmitting the indication of the one or more TIDs comprises transmitting a value of the plurality of values in the TIM corresponding to the AID of the non-AP MLD.

Clause 18: The method of Clause 18, further comprising transmitting a TID bitmap, wherein: each value of the plurality of values, that indicates that the AP MLD has the BUs for the respective AID, corresponds to an associated TID bitmap, the TID bitmap indicating the TIDs for which the AP MLD has the BUs for the respective AID; and transmitting the indication of the one or more TIDs comprises transmitting the TID bitmap including a value identifying the one or more TIDs.

Clause 19: The method of Clause 19, wherein each TID in the TID bitmap is mapped to a respective link or a set of links of the plurality of links.

Clause 20: The method of Clause 20, wherein each link of the plurality of links is associated with one or more TIDs.

Clause 21. The method of Clause 18, wherein transmitting the indication of the one or more TIDs comprises transmitting a message including a medium access control (MAC) header control field that indicates the one or more TIDs.

Clause 22: The method of Clause 22, wherein the MAC header control field comprises a high efficiency (HE) A-control field including at least one of a TID bitmap or a TID field that indicates the one or more TIDs.

Clause 23: The method of any of Clauses 22-23, wherein each TID is mapped to one link or a set of links of the plurality of links.

Clause 24: The method of any of Clauses 22-24, wherein the message comprises a Quality of Service (QoS) Null message or a QoS data message that indicates the one or more TIDs.

Clause 25: The method of claim 25, further comprising receiving a poll message from the non-AP MLD, wherein the QoS Null message or the QoS data message is transmitted in response to the poll message.

Clause 26. The method of claim 18, wherein each respective AID indicated in the TIM is mapped to a single respective link of the plurality of links and wherein transmitting the indication of the one or more TIDs comprises determining the one or more TIDs based on a link associated with the AID of the non-AP MLD.

Clause 27. The method of any one of claim 18, further comprising receiving a poll message in response to the TIM, wherein transmitting the BUs is in response to the poll message.

Clause 28: The method of any of Clauses 17-28, further comprising: transmitting another indication of another TID for which the AP MLD has other BUs for the non-AP MLD; and determining another link associated with the other TID, wherein transmitting the BUs comprises transmitting the other BUs to the non-AP MLD on the other link.

Clause 29: A wireless communication device, comprising: at least one modem; at least one processor communicatively coupled with the at least one modem; and at least one memory communicatively coupled with the at least one processor and storing processor-readable code that, when executed by the at least one processor in conjunction with the at least one modem, is configured to: receive an indication of an association identifier (AID) associated with a non-access point (AP) multilink device (MLD), wherein the indication of the AID indicates whether an access point (AP) has buffered units (BUs) for the non-AP MLD; determine one or more links associated with one or more traffic identifiers (TIDs) based on a mapping of a plurality of TIDs, including the one or more TIDs, to a plurality of links, including the one or more links; and receive the BUs associated with the one or more TIDs from the AP on the determined links.

Clause 30: A wireless communication device, comprising: at least one modem; at least one processor communicatively coupled with the at least one modem; and at least one memory communicatively coupled with the at least one processor and storing processor-readable code that, when executed by the at least one processor in conjunction with the at least one modem, is configured to: transmit an indication of an association identifier (AID) associated with a non-access point (AP) multilink device (MLD), wherein the indication of the AID indicates whether an AP has buffered units (BUs) for the non-AP MLD; determine one or more links associated with one or more TIDs based on a mapping of a plurality of TIDs, including the one or more TIDs, to a plurality of links, including the one or more links; and transmit the BUs associated with the one or more TIDs to the non-AP MLD on the determined links.

Clause 31: An apparatus, comprising means for performing a method in accordance with any one of Clauses 1-28.

Clause 32: A non-transitory computer-readable medium comprising computer-executable instructions that, when executed by one or more processors of a processing system, cause the processing system to perform a method in accordance with any one of Clauses 1-28.

Clause 33: A computer program product embodied on a computer-readable storage medium comprising code for performing a method in accordance with any one of Clauses 1-28.

ADDITIONAL CONSIDERATIONS

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a first non-access point (non-AP) multi-link device (MLD) that includes one or more non-AP stations, comprising:
receiving, from an access point (AP), a traffic indication map (TIM) that includes a plurality of values, wherein each value of the TIM:
indicates a respective association identifier (AID) associated with a respective non-AP MLD of a plurality of non-AP MLDs, including a first AID associated with the first non-AP MLD, and
indicates whether the AP has buffered units (BUs) for the respective non-AP MLD, including the first non-AP MLD;
receiving, from the AP by a first non-AP station of the one or more non-AP stations affiliated with the first non-AP MLD, a message that includes a medium access control (MAC) header control field indicating one or more traffic identifiers (TIDs) of the BUs for the first non-AP MLD;
determining one or more links, of a plurality of links, associated with the one or more TIDs based on a mapping of a plurality of TIDs, including the one or more TIDs, to the plurality of links; and
receiving the BUs associated with the one or more TIDs from the AP on the determined one or more links.

2. The method of claim 1, wherein:
receiving the message indicating the one or more TIDs comprises receiving a respective bitmap for each respective AID indicated in the TIM;
each respective bitmap indicates TIDs for which the AP has the BUs for the respective AID corresponding to that respective bitmap.

3. The method of claim 2, wherein each TID indicated by the each respective bitmap is mapped to a respective link or a respective set of links of the one or more links.

4. The method of claim 3, wherein each link of the one or more links is associated with at least one TID.

5. The method of claim 1, wherein the MAC header control field comprises a high efficiency (HE) A-control field including at least one of a TID bitmap or a TID field that indicates the one or more TIDs.

6. The method of claim 1, wherein the message comprises a Quality of Service (QoS) Null message or a QoS data message.

7. The method of claim 6, further comprising transmitting a poll message to the AP, wherein the QoS Null message or the QoS data message is received in response to the poll message.

8. The method of claim 1, wherein each respective AID indicated in the TIM is mapped to a single respective link of the plurality of links and wherein receiving the indication of the one or more TIDs comprises determining the one or more TIDs based on the single respective link associated with the AID of the non-AP MLD.

9. The method of claim 1, further comprising:
transmitting a poll message based on receiving the TIM, wherein the BUs are received based on the poll message.

10. The method of claim 1, further comprising:
receiving another indication of another TID for which the AP has other BUs for the non-AP MLD; and
determining another link associated with the other TID, wherein receiving the BUs comprises receiving the other BUs from the AP on the other link.

11. A method for wireless communications by an access point (AP) multi-link device (MLD), comprising:
transmitting a traffic indication map (TIM) that includes a plurality of values, wherein each value of the TIM:
indicates a respective association identifier (AID) associated with a respective non-AP MLD of a plurality of non-AP MLDs, including a first AID associated with a first non-AP MLD, and indicates whether the AP has buffered units (BUs) for the respective non-AP MLD, including the first non-AP MLD;
transmitting, to a first non-AP station of one or more non-AP stations affiliated with the first non-AP MLD, a message that includes a medium access control (MAC) header control field indicating one or more traffic identifiers (TIDs) of the BUs for the first non-AP MLD;
determining one or more links, of a plurality of links, associated with the one or more TIDs based on a mapping of a plurality of TIDs, including the one or more TIDs, to the plurality of links; and
transmitting the BUs associated with the one or more TIDs to the non-AP MLD on the determined one or more links.

12. The method of claim 11, wherein:
transmitting the message indicating the one or more TIDs comprises transmitting a respective bitmap for each respective AID indicated in the TIM; and each respective bitmap indicates the TIDs for which the AP MLD has the BUs for the respective AID corresponding to that respective bitmap.

13. The method of claim 12, wherein each TID indicated by each respective bitmap is mapped to a respective link or a set of links of the plurality of links.

14. The method of claim 13, wherein each link of the plurality of links is associated with one or more TIDs.

15. The method of claim 11, wherein the MAC header control field comprises a high efficiency (HE) A-control field including at least one of a TID bitmap or a TID field that indicates the one or more TIDs.

16. The method of claim 11, wherein the message comprises a Quality of Service (QoS) Null message or a QoS data message.

17. The method of claim 16, further comprising receiving poll message from the non-AP MLD, wherein the QoS Null message or the QoS data message is transmitted in response to the poll message.

18. The method of claim 11, wherein each respective AID indicated in the TIM is mapped to a single respective link of the plurality of links and wherein transmitting the indication of the one or more TIDs comprises determining the one or more TIDs based on a link associated with the AID of the non-AP MLD.

19. The method of claim 11, further comprising receiving a poll message based on the TIM, wherein transmitting the BUs is based on the poll message.

20. The method of claim 11, further comprising:
transmitting another indication of another TID for which the AP MLD has other BUs for the non-AP MLD; and
determining another link associated with the other TID, wherein transmitting the BUs comprises transmitting the other BUs to the non-AP MLD on the other link.

21. A non-access point (non-AP) multi-link device (MLD) that includes a plurality of non-AP stations, comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured cause the non-AP MLD device to:
receive, from an access point (AP), a traffic indication map (TIM) that includes a plurality of values, wherein each value of the TIM:
indicates a respective association identifier (AID) associated with a respective non-AP MLD of a plurality of non-AP MLDs, including a first AID associated with the first non-AP MLD, and
indicates whether the AP has buffered units (BUs) for the respective non-AP MLD, including the first non-AP MLD;
receive, from the AP by a first non-AP station of the one or more non-AP stations affiliated with the first non-AP MLD, a message that includes a medium access control (MAC) header control field indicating one or more traffic identifiers (TIDs) of the BUs for the first non-AP MLD;
determine one or more links, of a plurality of links, associated with the one or more TIDs based on a mapping of a plurality of TIDs, including the one or more TIDs, to the plurality of links; and
receive the BUs associated with the one or more TIDs from the AP on the determined one or more links.

22. An access point (AP) multi-link device (MLD), comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to cause the AP MLD to:
transmit a traffic indication map (TIM) that includes a plurality of values, wherein each value of the TIM:
indicates a respective association identifier (AID) associated with a respective non-AP MLD of a plurality of non-AP MLDs, including a first AID associated with a first non-AP MLD, and
indicates whether the AP has buffered units (BUs) for the respective non-AP MLD, including the first non-AP MLD;
transmit, to a first non-AP station of one or more non-AP stations affiliated with the first non-AP MLD, a message that includes a medium access control (MAC) header control field indicating one or more traffic identifiers (TIDs) of the BUs for the first non-AP MLD;
determine one or more links, of a plurality of links, associated with the one or more TIDs based on a mapping of a plurality of TIDs, including the one or more TIDs, to the plurality of links; and
transmit the BUs associated with the one or more TIDs to the non-AP MLD on the determined one or more links.

* * * * *